United States Patent [19]

Guyette

[11] Patent Number: 5,425,986
[45] Date of Patent: Jun. 20, 1995

[54] HIGH PRESSURE LAMINATE STRUCTURE

[75] Inventor: John M. Guyette, Ann Arbor, Mich.

[73] Assignee: Masco Corporation, Taylor, Mich.

[21] Appl. No.: 918,542

[22] Filed: Jul. 21, 1992

[51] Int. Cl.[6] .................. B32B 5/16; B32B 27/08; B32B 31/12
[52] U.S. Cl. ..................... 428/283; 428/288; 428/290; 428/297; 428/312.4; 428/323; 428/530; 428/531; 428/525; 156/307.4
[58] Field of Search ............... 428/283, 288, 290, 297, 428/312.4, 323, 530, 531, 525

[56] References Cited

U.S. PATENT DOCUMENTS

| | | |
|---|---|---|
| 3,548,559 | 12/1970 | Levine . |
| 4,505,974 | 3/1985 | Hosler ................... 428/530 |
| 4,625,491 | 12/1986 | Gibson . |
| 4,636,443 | 1/1987 | Jaisle et al. ............. 428/503 |
| 4,645,717 | 2/1987 | Berbeco ................. 428/503 |
| 4,657,798 | 4/1987 | Guilhem . |
| 4,689,102 | 8/1987 | Prawdzik et al. ......... 428/503 |
| 4,789,604 | 12/1988 | van den Hoeoen ....... 428/503 |
| 4,880,689 | 11/1989 | Park et al. . |
| 5,047,282 | 9/1991 | Mier . |

FOREIGN PATENT DOCUMENTS 0052429 4/1977 Japan .

Primary Examiner—P. C. Sluby
Attorney, Agent, or Firm—Myron B. Kapustij; Malcolm L. Sutherland

[57] ABSTRACT

This invention is directed to a high pressure process for preparing a laminate structure comprised of a fiber cementboard core having laminated to at least one surface thereof at least one intermediate resin impregnated paper sheet or lamina and a decorative resin impregnated paper sheet or lamina. The process comprises forming an assembly comprised of a fiber cementboard core having superimposed on at least one surface thereof at least one intermediate resin impregnated paper sheet and a decorative resin impregnated paper sheet, and subjecting said assembly to a temperature of at least about 100° C. and a pressure of at least about 500 psi for a time effective to laminate said assembly.

31 Claims, 2 Drawing Sheets

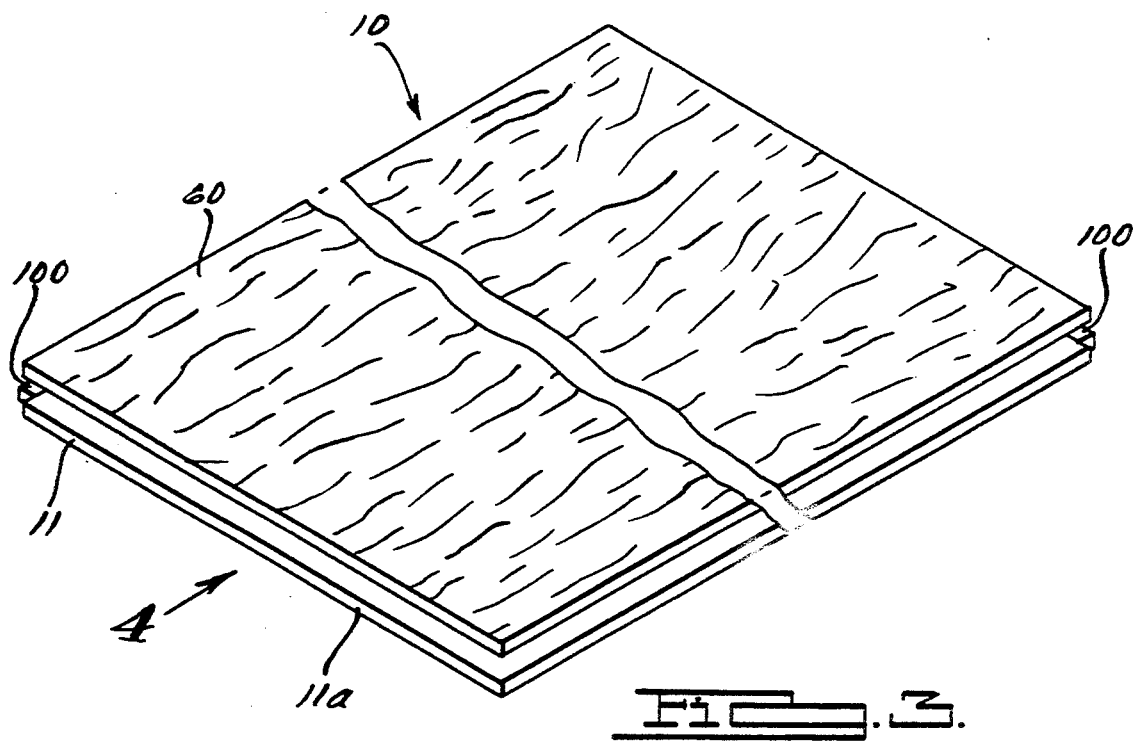
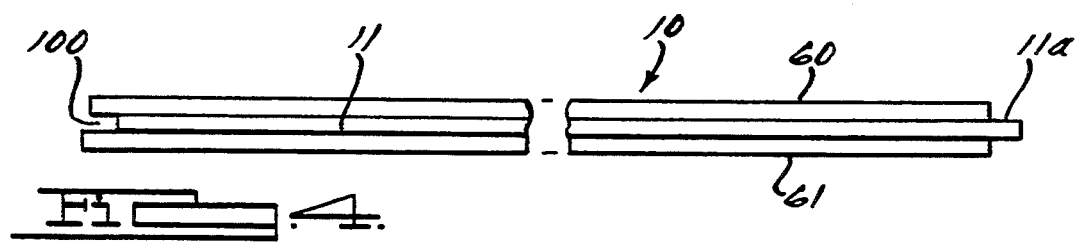
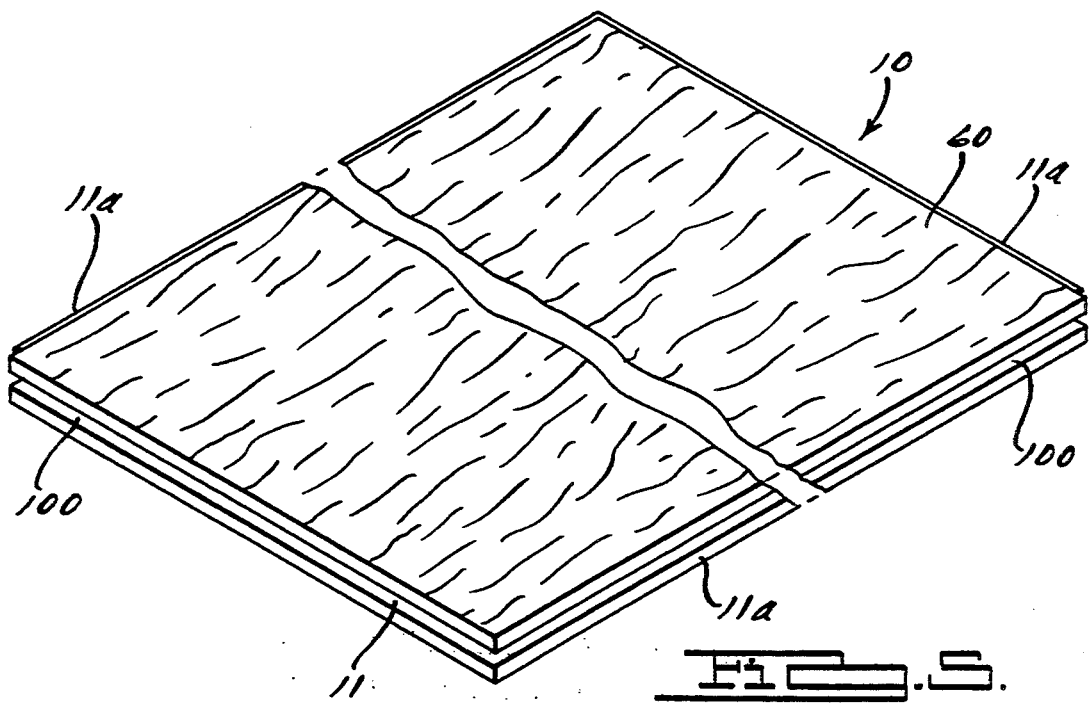

HIGH PRESSURE LAMINATE STRUCTURE

FIELD OF THE INVENTION

This invention relates to a method for manufacturing laminates. More particularly, it relates to a high pressure method for manufacturing high pressure laminates.

BACKGROUND OF THE INVENTION

High pressure laminates comprised of a core such as a particle board having a sheet laminate comprised of a plurality of resin impregnated paper sheets adhered to said core are known in the art. For example, U.S. Pat. No. 4,645,717 describes such a laminate and a method for preparing such laminate. The method of preparing such composite laminates, as disclosed in U.S. Pat. No. 4,645,717, comprises first preparing a sheet laminate by stacking the resin saturated sheets in the desired pattern and position in a mold or press where the sheets are subject to heat and high pressure sufficient to form a sheet laminate. The sheet laminate is removed from the mold or press and is then adhered to a surface of the particle board through the use of an adhesive.

However, this procedure is a two step process which is labor intensive. The first step involves stacking and arranging the thermosetting resin impregnated sheets in the mold or press and then laminating them to form a sheet laminate. The second step involves bonding the preformed sheet laminate, via a suitable adhesive, to the surface of the particle board core.

It would be economically advantageous if a high pressure laminate could be prepared in a one step process, i.e., if the resin impregnated sheets could be laminated to a core without first having to form a sheet laminate and then adhering this preformed sheet laminate to a core in a separate procedure.

The instant invention provides such a process. In the instant process the resin impregnated sheets are substantially simultaneously formed into a sheet laminate and the sheet laminate is laminated to the core.

SUMMARY OF THE INVENTION

This invention relates to a laminate structure, particularly high pressure laminate structure, and to a method of manufacturing such structure. In particular the invention concerns high pressure laminate structure comprised of a core comprised of fiber cementboard having laminated to at least one, preferably to both, of its surfaces at least one sheet of resin impregnated fibrous material such as paper.

The laminate structure of the instant invention comprises a laminate suitable for a surface covering such as counter and table top, flooring and the like having a hard, stain resistant, washable top surface. Such laminate structure comprises a core substrate comprised of fiber cementboard, and one or more resin saturated or impregnated fibrous sheets or plies laminated to at least one, but preferably to both, surfaces of said core. The laminate structure is particularly useful as a floor covering.

The method of manufacturing the instant laminate structure is a one step high pressure process comprising placing the core substrate in a press or mold with the resin treated fibrous sheet or sheets disposed on one, preferably both, of the core substrates sides in the press or mold. The various plies and the core are then laminated together by the application of high pressure and heat in the press or mold.

BRIEF DESCRIPTION OF THE DRAWINGS

FIG. 3 is a top front perspective view of the laminate structure as a whole after assembly and after the assembly has been subjected to temperature and pressure adequate for lamination to occur. This view shows the laminate structure has been machined to form a tongue and groove structure;

FIG. 4 is a side elevational view taken along line 4 in FIG. 3; and

FIG. 5 is a top rear perspective view of the laminate structure of FIG. 3.

DESCRIPTION OF THE PREFERRED EMBODIMENT

Figure 1:
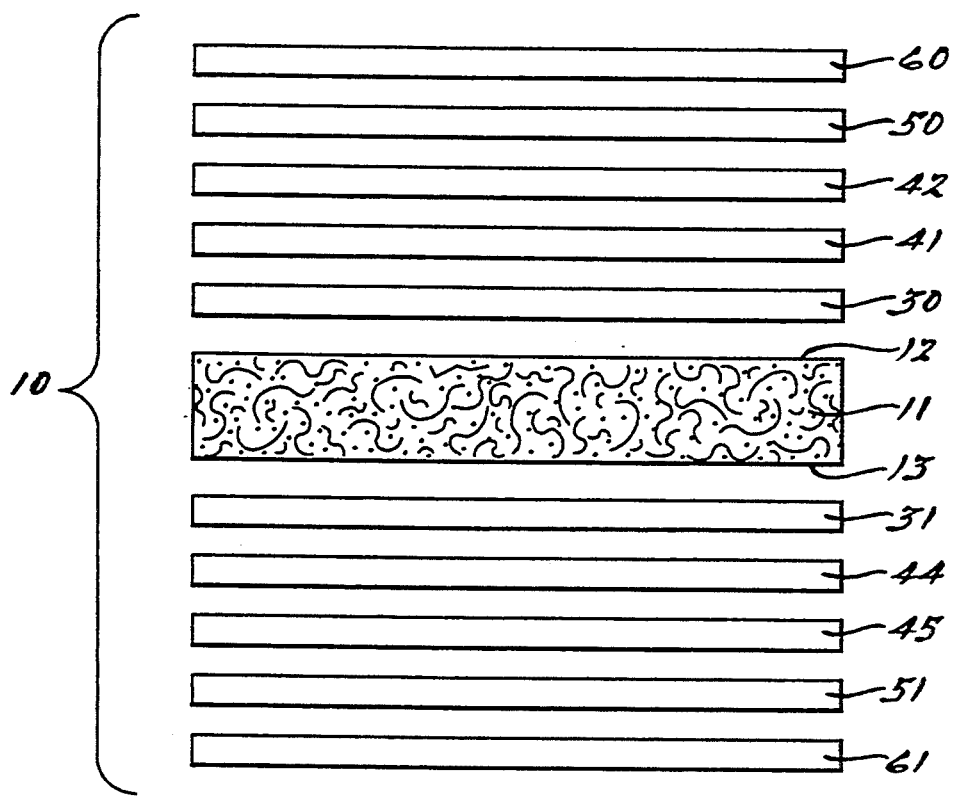
FIG. 1 is a cross-sectional view of the laminate structure showing, in a separate manner, the core and each sheet or group of sheets which comprises the laminate structure.

Referring to FIG. 1 a typical laminate structure 10 of one embodiment of the instant invention is illustrated. This laminate structure 10 comprises a core or substrate 11 comprised of fiber cementboard having a top side or face 12 and a bottom side or face 13. The fiber cementboard is well known to those skilled in the art and is readily commercially available. It may generally be manufactured by blending one or more natural or synthetic fibers with one or more mineral based materials such as cement and other additives. The total blend is then formed into a sheet, compressed, and cured under ambient, controlled or autoclaved conditions. Some illustrative non-limiting examples of natural fibers include flax and hemp mineralized by additives. Some illustrative non-limiting examples of synthetic fibers include polyacryl nitrate and polyvinyl alcohol.

Other types of fibers include mineral fibers such as rock wool and slag wool, glass strands in the form of staple or network, various fibrillous synthetic networks, and cellulosic fibers.

The core sheet of fiber cementboard generally has a thickness of from about 2 to about 30 millimeters, preferably from about 3 to about 15 millimeters, and more preferably from about 4 to about 12 millimeters.

The laminate structure includes a decorative sheet 50. This decorative sheet is generally comprised of a resin saturated or impregnated fibrous sheet material which may be of a solid color or it may have some decorative design printed thereon.

Optionally, and particularly when the decorative sheet contains a printed design, one may superimpose on the decorative sheet a protective overlay sheet, represented by reference numeral 60. The overlay sheet 60 functions to protect the decorative sheet 50 against scuffing, marring and abrasion. The protective overlay sheet 60 is either transparent or becomes transparent during the lamination procedure so that the decorative sheet 50 can readily be seen through overlay sheet 60.

Instead of utilizing a protective overlay sheet to protect the decorative sheet 50, a protective coating layer (identified by reference numeral 70 in FIG. 2) may be used. The protective coating layer is either transparent or becomes transparent during the lamination procedure so that the decorative sheet 50 can readily be seen through the protective layer.

If a protective coating layer 70 is utilized it is generally comprised of a thermosetting resin, preferably a noble thermosetting resin, containing particulate abrasive material such as alumina, titanium oxide, tin oxide, zirconium oxide, diamond, alumina coated on silica, and zirconia coated on silica. Such layer is applied onto the exposed outer surface of the decorative sheet 50, or it may be incorporated into the decorative sheet 50 in conventional ways such as by dipping, spraying, knife coater or roll coater.

A decorative sheet containing such a protective layer or overlay sheet and method for manufacturing such sheet are disclosed in U.S. Pat. Nos. 4,880,689 and 4,322,468, both of which are incorporated by reference. Also disclosing laminates and methods of preparation thereof containing an abrasion resistant coating are U.S. Pat. Nos. 4,255,480; 4,263,081; 4,305,987; 4,327,141; 4,395,452; 4,400,423; 4,430,375; 4,517,235; and 4,505,974, all of which are incorporated herein by reference.

If a protective overlay sheet 60 is used the overlay sheet is preferably impregnated with an abrasive material filled resin, preferably a thermosetting resin, and more preferably a noble thermosetting resin. The methods of manufacturing such overlay sheets, the resins and the abrasive materials utilized, and the sheets themselves are described, inter alia, herein and in the above disclosed patents.

In a preferred embodiment of the instant invention a protective overlay sheet is utilized. Preferably this protective overlay sheet is saturated with a resin containing a filler such as alumina oxide.

Disposed intermediate the decorative sheet 50 and the top surface 12 of the fiber cementboard core 11 is at least one, but preferably a plurality, such as from two to about eight, of resin saturated fibrous sheets 41–42. These intermediate laminae or plies are disposed between the decorative sheet 50 and the top surface 12 of core 11 to generally prevent the telegraphing of defects or patterns in the fiber cementboard surface 12 to the decorative sheet 50, and to impart improved impact resistance qualities to the finished product surface.

The sheets 41–42 may be comprised of any suitable fibrous sheet materials, such as cellulosic fibrous sheet materials, which can be saturated with, or can absorb, the resin solution. Preferably they are comprised of fibrous paper sheet materials, such as kraft paper, which are impregnated with a thermosetting resin, such as from about 5 to about 75 percent by weight, for example, about 15 to 50 percent of thermosetting resin.

Preferably sheets 41–42 are comprised of kraft paper. Preferred kraft paper is kraft paper having a weight of from about 25 to about 400 grams per square meter, preferably from about 50 to about 350 grams per square meter, and more preferably from about 100 to about 275 grams per square meter.

The laminate structure 10 may optionally include a thick kraft paper sheet 30 interposed between the intermediate laminae 41–42 and the top surface 12 of the fiber cementboard 11. The kraft paper sheet 30 is impregnated with a curable resin. Kraft paper sheet 30 is preferably lighter in weight than kraft paper sheets 41–42 and is saturated with more resin than sheets 41–42. Thus, for example, while kraft paper sheets 41–42 have a weight of about 250 grams per square meter and contains about 28 weight percent resin, kraft paper sheet 30 weighs 225 grams per square meter and contains about 33 weight percent resin.

Weight percent resin is calculated as follows:

$$\text{weight percent resin} = \frac{\text{weight of dry resin}}{\text{weight of resin} + \text{weight of paper}}$$

The top surface 12 of the fiber cementboard may optionally contain an adhesive layer (identified by reference numeral 20 in FIG. 2) disposed thereon. Such an adhesive layer may generally be used when the kraft paper sheet 30 is the same or similar to sheets 41–42, or when such kraft paper sheet 30 is not impregnated with a curable resin. However, such an adhesive layer may also be present even when the kraft paper sheet 30 is used in order to improve adhesion of said kraft paper sheet 30 or if said kraft paper sheet 30 is not present, to improve the adhesion of the intermediate sheet 41 to the fiber cementboard surface 12.

In the embodiment illustrated in FIG. 1 the laminate structure also includes at least one, but preferably a plurality, such as from two to about eight, of resin saturated sheets 44–45 disposed on the bottom surface 13 of fiber cementboard 11. These sheets and their arrangement is similar or identical to sheets 41–42 and their arrangement discussed hereinafore.

The laminate structure 10 may optionally include a kraft paper sheet 31 interposed between sheets 44–45 and the bottom surface 13 of the fiber cementboard 11. The kraft paper sheet 31 is similar or identical to kraft paper sheet 30 discussed supra.

The bottom surface 13 of the fiber cementboard may optionally contain an adhesive layer disposed thereon. Such an adhesive layer is generally used when the kraft paper sheet 31 is not impregnated with a curable resin. However, such an adhesive layer may also be present even when the kraft paper sheet 31 is impregnated with a resin in order to improve adhesion of said kraft paper sheet 31 to the bottom surface 13 of said fiber cementboard 11 or if said kraft paper sheet 31 is not present, to improve the adhesion of the lamina 44 to the bottom surface 13 of said fiber cementboard.

As also illustrated in FIG. 1, the laminate structure may also optionally contain a decorative sheet 51, similar or identical to decorative sheet 50, and a protective coating or overlay sheet 61 similar or identical to protective coating or overlay sheet 60 disposed on decorative sheet 50.

The resins employed to saturate or impregnate the decorative sheets 50 and 51, overlay sheets 60 and 61, intermediate sheets 41–45 and sheets 30 and 31 are preferably thermosettable or cross-linkable resins. These resins include thermosetting polyester resins, phenolic resins and formaldehyde-type thermosetting resins. The thermosetting polyester resins, aldehyde, preferably formaldehyde, type thermosetting resins, and phenolic resins are well known to those skilled in the art and are generally commercially available.

The formaldehyde-type thermosetting resins include the melamine-formaldehyde resins, modified melamine-formaldehyde resin, urea-formaldehyde resins, phenol-formaldehyde resins, and other methylol-type resins which are heat curable in the presence of a catalyst.

One illustrative type of thermosettable modified melamine-formaldehyde resin has the following formulation: formaldehyde as an aqueous solution and melamine crystal in a molar ratio of about 2:1; plasticizer such as toluene sulfonamide, ethylene glycol, diethylene glycol, polyethylene glycol, urea, 2-phenoxyethanol; buffers such as sodium hydroxide, diethanolamine, triethanolamine, ammonia; and solvents such as water, isopropanol, ethanol.

Other illustrative types of thermosettable melamine-formaldehyde and urea-formaldehyde resins are disclosed, inter alia, in U.S. Pat. Nos. 2,773,848; 4,713,299; 3,033,823; and 3,928,706, all of which are incorporated herein by reference.

Some illustrative thermosettable phenol-formaldehyde resins are disclosed in U.S. Pat. Nos. 3,672,935 and 5,066,698, incorporated herein by reference.

The thermosettable polyester resins may generally be formed by condensation reaction of anhydrides such as maleic anhydride or carboxylic acids such as maleic acid with alcohols; generally anhydrides or dicarboxylic acids with polyols such as ethylene glycol and the like, and including optionally an aromatic unsaturated polycarboxylic acid or anhydride such as phthalic acid or anhydride, isophthalic acid or anhydride, terephthalic acid or anhydride, and the like. The bond resulting from the condensation reaction is an ester bond. Generally the mixture is dissolved in an unsaturated monomer such as styrene, the unsaturated polyesters usually being cross-linked through their double bonds in the presence of a suitable unsaturated monomer. In the presence of catalysts, and generally of heat, the resins will cure to form a hard thermoset.

Polyester resins are formed from a variety of materials including maleic acid or anhydride, fumaric acid, phthalic acid or anhydride, or isophthalic acid, with alcohols such as ethylene glycol, propylene glycol, diethylene glycol and dipropylene glycol. The most common cross-linking agents are styrene and diallyl phthalate.

Peroxide catalysts such as benzoyl peroxide, methyl ethyl ketone peroxide, tertiary butyl perbenzoate and cumene hydroperoxide are usually added to the polyester resin to effect curing. A number of other peroxide catalysts such as cyclohexanone peroxide, 2,4-dichlorobenzoyl peroxide, bis-(para-bromobenzoyl) peroxide, and acetyl peroxide, are also used.

Polymerization inhibitors are added to polyester resins to prevent polymerization of the polyester resin at room temperature in the absence of catalysts. Some typically used inhibitors include hydroquinone, paratertiary-butyl-catechol, phenolic resins, aromatic amines, pyroqallol, chloranil, picric acid and quinones.

General literature references relevant to polyester resins which may be used in preparing resin compositions in accordance with the invention are the Condensed Chemical Dictionary (10th Ed.), G. D. Hawley (Reviser), Van Nostrand Reinhold (N.Y.), 1981, p 830; Encyclopaedia of Polymer Science and Technology, H. F. Mark, N. G. Gaylord, and N. M. Bikales (Eds.), John Wiley and Sons, N.Y., 1969, Vol. 11, p 62–168; and U.S. Pat. Nos. 3,396,067 and 2,255,313 the disclosures thereof being incorporated herein by reference.

The sheet materials, i.e., sheets 30, 31, 41–45, 50, 51, 60 and 61 employed in the preparation of the instant laminate structure 10 may comprise any fibrous sheet materials, such as cellulosic fibrous sheet materials, which can be saturated with, or can absorb, the thermosettable resin solution, but more particularly are composed of fibrous paper sheet materials which contain and are impregnated with a thermosettable resin, such as from about 5 to 75 percent by weight, for example 15 to 50 percent of the curable resin. The resin is heat curable and the resin composition often includes a catalyst to accelerate the cure of the resin under the heat and pressure conditions employed in forming the sheet laminate.

The catalyst is employed in an amount sufficient to provide for curing or thermosetting the resin under the heat and pressure conditions used in preparing the laminate material. Such catalyst and the amounts used are well known in the art and typically, for example, may comprise Lewis acid-type catalysts, particularly Lewis acid metal salt catalysts, such as aluminum trichloride, borontrifluoride or multivalent metallic salt halides or sulfates, such as magnesium chloride or zinc sulfate, and other catalysts employed in curing thermosetting resins.

The adhesive layers 20, 21, when present, may be comprised of any suitable adhesive. Such adhesives include those based on urea-formaldehyde, phenol-formaldehyde, resorcinal, melamine, isocyanate/urethane, polyvinyl acetate, and epoxy. All such adhesives are well known in the art and are commercially available.

In a preferred embodiment the decorative sheets 50 and 51 may be a solid color sheet of alpha-cellulose paper or they may be an alpha-cellulose sheet on which there has been printed some decorative design such as a floral pattern, a wood print or a geometrical design or the like. The alpha-cellulose paper preferably has a weight of from about 50 to about 200 grams per square meter, more preferably from about 80 to about 150 grams per square meter. The decorative sheet is generally impregnated with one of the noble resins such as the melamine-formaldehyde resins, the urea-formaldehyde resins, the polyester resins, and the like. The amount of resin present is from about 15 to about 55 weight percent, preferably from about 25 to about 45 weight percent.

If desired and particularly when the decorative sheet is a printed design, one may optionally superimpose over the decorative sheet a protective overlay sheet 60, 61 which is generally a fine quality alpha-cellulose paper sheet impregnated with an abrasive material filled noble thermosetting resin, the resin preferably being of the same class as that used to impregnate the decorative sheet 50, 51. Sheets 60, 61 are either initially transparent or the overlay sheets become transparentized during the lamination process so that the decorative sheets 50 and 51 can readily be seen through the overlay sheets 60 and 61. The alpha-cellulose sheets preferably have a weight of from about 20 to about 60 grams per square meter, preferably from about 30 to about 50 grams per square meter. They preferably contain from about 45 to about 75 weight percent resin, more preferably from about 55 to about 70 weight percent resin.

Other protective overlay sheets have also been used, such as thermoplastic nonporous films. The term "noble" resins is an expression conventionally used in the trade to indicate that the resin does not undergo any significant darkening during the heat and pressure consolidated steps as contrasted with the base resins such as the phenolics which have a tendency to turn dark brown and sometimes black.

Figure 2:
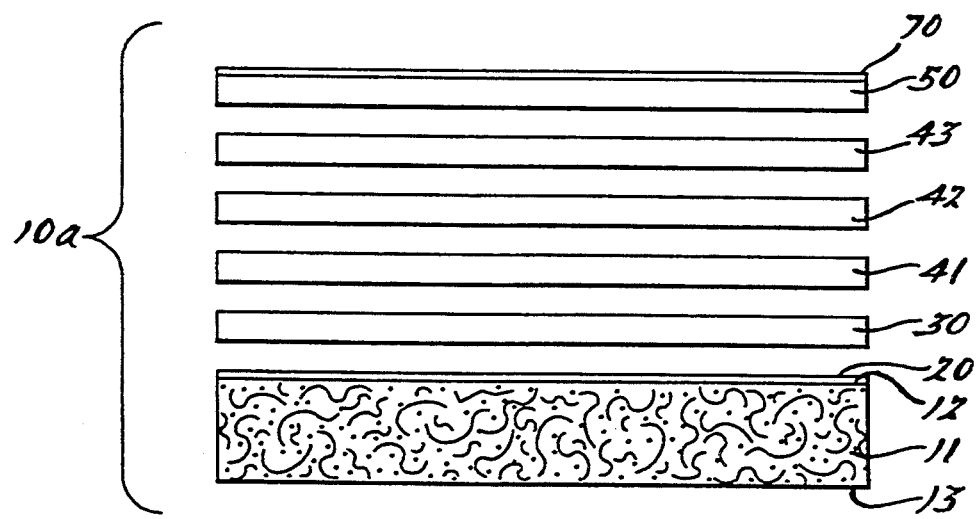
FIG. 2 is a cross-sectional view of another embodiment of the laminate structure showing, in a separate manner, the core and each sheet or group of sheets which comprises the laminate structure.

In the embodiment illustrated in FIG. 2 the sheet laminae are disposed on only the top surface 12 of the core fiber cementboard 11. Furthermore, the top of decorative sheet 50 has disposed thereon a protective coating layer 70 instead of a protective overlay sheet 60 of the embodiment illustrated in FIG. 1. Furthermore, an adhesive layer 20 is disposed on the top surface 12 of the core 11.

It is to be understood that in the embodiment illustrated in FIG. 2 the core fiber cementboard 11 may also have sheet laminae disposed on its bottom surface 13, while in the embodiment illustrated in FIG. 1 the core fiber cementboard 11 may have the sheet laminae disposed only on its top surface 12.

The resin impregnated kraft paper sheets 41–45, top resin impregnated alpha-cellulose sheets 50, protective overlay sheets 60, 61, and kraft paper sheets 30, 31, are well known to those skilled in the art and are commercially available and may be purchased from, for example, Formica Corporation of Wayne, N.J.

In the one step process of the instant invention for manufacturing the laminate structure illustrated in FIG. 1, the various sheets and core 11 are stacked in a superimposed relationship—sheets or plies 30, 41–42, 50 and 60 are stacked in a superimposed relationship as shown in FIG. 1 on the front side 12 of fiber cementboard core 11 and the sheets or plies 31 and 44–45, 51 and 61 are stacked in a superimposed relationship as shown in FIG. 1 on the back side 13 of the core 11 in a press or mold. Thereupon, the entire assembly is subjected to heat and pressure until consolidated into a unitary laminate structure. When using a press the assembly is placed between two plates. The plates are preferably steel plates, and more preferably polished steel plates.

The pressures to which the assembly is subjected are from about 500 to about 2,500 psi or more, preferably from about 500 to about 2,000 psi, more preferably from about 1,000 to about 1,500 psi. The temperatures are temperatures which are effective to cure or thermoset the thermosettable resins with which the sheets are impregnated and to laminate the various sheets or plies, including the core 11. Generally, these temperatures are from about 100° to about 250° C., preferably from about 120° to about 200° C., and more preferably from about 130° to about 160° C.

The press time, i.e., the time the sheet core assembly is subjected to elevated pressures and temperature, is the time effective to thermoset the thermosettable resin and form the laminate structure. This time may vary depending upon the temperatures and pressures used. Generally, the higher the pressure and/or temperature the shorter the press time. Generally, the press time is from about 5 minutes to about 120 minutes, preferably from about 5 minutes to about 30 minutes.

Once the laminate structure 10 is formed it can be machined to form a tongue 11a and groove 100 structure in each individual laminate element or piece so that the laminate pieces may be joined together to form the covering. The pieces are joined together by inserting the tongue 11a of one piece into a corresponding groove 100 of an adjoining piece.

The tongue 11a structure is machined by cutting away a portion of the top and bottom laminated paper sheets to expose the core fiber cementboard 11. The groove 100 is formed by cutting out a portion of the core fiber cementboard 11 between the top and bottom laminated paper sheets to form the groove 100.

In order that those skilled in the art may more fully understand the inventive concept presented herein, the following example is set forth. This example is given solely by way of illustration and is not by way of limitation. All parts and percentages are by weight unless otherwise stated.

A laminating assembly is prepared by stacking, in superimposed relationship substantially as illustrated in FIG. 1: a commercially available melamine-formaldehyde resin impregnated (about 67 weight percent resin content) translucent alpha-cellulose overlay sheet (the sheet has a weight of 43 grams per square meter), a commercially available melamine-formaldehyde resin impregnated (about 35 weight percent resin content) alpha-cellulose print sheet (having a weight of about 110 grams per square meter) bearing a wood print design, two sheets of commercially available phenolic resin impregnated (about 28 weight percent resin content) kraft paper (having a weight of about 250 grams per square meter); and one bottom sheet of commercially available phenolic resin impregnated (about 33 weight percent resin content) kraft paper (having a weight of about 125 grams per square meter).

A second, identical assembly is prepared in the same manner. A commercially available fiber cementboard about 6 mm thick is disposed between the bottom sheet in each of the two assemblies. Polished press plates are placed next to the overlay sheet to sandwich the pair of back-to-back assemblies with the core fiber cementboard therebetween between the press plates and the entire assembly is consolidated, in a laminating press, at a temperature about 150° C. under a pressure of 1400/in$^2$ for about 12 minutes. Following lamination, the press is allowed to cool to about 140° F. and the laminated structure is removed from the press.

What is claimed is:

1. A laminate structure prepared under high temperatures and pressures effective to consolidate said laminate structure comprising:
    a core comprised of fiber cementboard having a top and bottom surface;
    laminated to at least one of said surfaces of said core at least one intermediate lamina of thermosettable resin impregnated paper sheet; and
    laminated to the exposed surface of said intermediate paper sheet a thermosettable resin impregnated overlay sheet.
2. The laminate structure of claim 1 wherein said intermediate resin impregnated sheet is comprised of resin impregnated kraft paper.
3. The laminate structure of claim 2 wherein said resin is comprised of phenolic resin.
4. The laminate structure of claim 3 wherein said overlay sheet is comprised of resin impregnated alpha-cellulose paper.
5. The laminate structure of claim 4 wherein said resin is comprised of melamine formaldehyde resin.
6. The laminate structure of claim 5 wherein said overlay sheet has a protective layer disposed on its exposed surface.
7. The laminate structure of claim 6 wherein said protective layer comprises a resin impregnated alpha-cellulose protective sheet laminated to said overlay sheet.
8. The laminate structure of claim 7 wherein said resin is comprised of melamine-formaldehyde resin.
9. The laminate structure of claim 8 wherein said protective sheet contains abrasive particles having a mean particle size of from about 5 to about 30 microns and a Mohs hardness of at least about 9.
10. The laminate structure of claim 9 wherein said high temperatures are from about 100° C. to about 200° C.
11. The laminate structure of claim 10 wherein said high pressures are from about 500 psi to about 2,500 psi.
12. The laminate structure of claim 6 which includes a resin impregnated paper sheet having a higher resin content than said intermediate sheet disposed intermediate said core and said intermediate sheet and laminated to said core and said intermediate sheet.

13. The laminate structure of claim 12 wherein said paper sheet comprises a phenolic resin impregnated kraft paper sheet.

14. A laminate article comprising a core comprised of fiber cementboard having a top and bottom surface, at least one intermediate lamina comprised of thermosettable resin impregnated sheet laminated to at least one of said surfaces of said core, and a thermosettable resin impregnated overlay sheet laminated to the exposed surface of said intermediate sheet, said article being prepared by a method comprising forming an assembly comprised of said core having superimposed on at least one surface thereof at least said one intermediate lamina, and an overlay sheet on the exposed surface of said intermediate sheet, and subjecting said assembly to high temperatures and pressures for a time effective to laminate said assembly.

15. The article of claim 14 wherein said pressure is at least about 500 psi.

16. The article of claim 15 wherein said temperature is at least about 100° C.

17. The article of claim 15 wherein said pressure is at least about 1,000 psi.

18. The article of claim 16 wherein in said method a protective layer is superimposed on the exposed surface of said overlay sheet.

19. The article of claim 16 wherein said temperature is at least about 120° C.

20. The article of claim 19 wherein said temperature is at least about 130° C.

21. The article of claim 14 wherein in said method a protective layer is superimposed on the exposed surface of said overlay sheet.

22. The article of claim 14 wherein said intermediate resin impregnated paper sheet is comprised of kraft paper.

23. The article of claim 22 wherein said resin is comprised of phenolic resin.

24. The article of claim 14 wherein said resin impregnated decorative overlay sheet is comprised of alpha-cellulose paper.

25. The article of claim 24 wherein said resin is comprised of melamine-formaldehyde resin.

26. The article of claim 25 wherein said protective layer is comprised of resin impregnated paper sheet.

27. The article of claim 26 wherein said paper is alpha-cellulose paper.

28. The article of claim 27 wherein said resin is comprised of melamine-formaldehyde resin.

29. The article of claim 14 wherein in said method at least one intermediate sheet, said overlay sheet, and said protective layer are superimposed on only the top surface of said core.

30. The article of claim 14 wherein in said method at least one intermediate sheet, said overlay sheet, and said protective layer are superimposed on the top and bottom surfaces of said core in a back-to-back relationship.

31. The article of claim 14 which further includes forming a tongue and groove structure in the sides of said laminate article.

* * * * *